(12) United States Patent
Feit

(10) Patent No.: US 8,128,248 B2
(45) Date of Patent: *Mar. 6, 2012

(54) DIAL PLATE WITH DIFFUSE LIGHTING

(75) Inventor: Steven Feit, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/822,410

(22) Filed: Jun. 24, 2010

(65) Prior Publication Data

US 2010/0284165 A1    Nov. 11, 2010

Related U.S. Application Data

(63) Continuation of application No. 12/179,195, filed on Jul. 24, 2008, now Pat. No. 7,758,195.

(51) Int. Cl.
*G01D 11/28* (2006.01)

(52) U.S. Cl. ................ 362/23; 362/26; 116/DIG. 5

(58) Field of Classification Search ............ 362/23, 362/26, 27, 28; 116/286, 310, DIG. 5, DIG. 26, 116/DIG. 36

See application file for complete search history.

(56) References Cited

U.S. PATENT DOCUMENTS

| | | | |
|---|---|---|---|
| 2,102,384 A | 12/1937 | Scantlebury | |
| 4,233,927 A | 11/1980 | Oikawa et al. | |
| 4,872,415 A | 10/1989 | Nakadozono et al. | |
| 6,318,872 B1 | 11/2001 | Kato et al. | |
| 6,572,235 B1 * | 6/2003 | Neugart et al. | 362/23 |
| 6,585,385 B2 | 7/2003 | Nakagawa et al. | |
| 6,820,990 B2 | 11/2004 | Ewers et al. | |
| 6,926,417 B2 * | 8/2005 | Mikami | 116/DIG. 36 |
| 6,959,995 B2 | 11/2005 | Ikarashi et al. | |
| 6,979,094 B1 * | 12/2005 | Venkatram | 362/23 |
| 7,207,117 B1 | 4/2007 | Cook et al. | |
| 7,252,400 B2 | 8/2007 | Clugston et al. | |
| 7,525,446 B2 | 4/2009 | Shibata | |
| 7,607,808 B2 * | 10/2009 | Birman et al. | 362/28 |
| 2007/0236909 A1 | 10/2007 | Tamura | |
| 2008/0151525 A1 | 6/2008 | Kato | |

FOREIGN PATENT DOCUMENTS

| | | |
|---|---|---|
| JP | 60239605 | 11/1985 |
| JP | 11258010 A * | 9/1999 |

OTHER PUBLICATIONS

Information Disclosure Statement filed Jan. 27, 2009 in U.S. Application No. 12/179,195.
Office Action mailed Sep. 17, 2009 in U.S. Appl. No. 12/179,195.
Response to Office Action filed Dec. 17, 2009 in U.S. Appl. No. 12/179,195.
Notice of Allowance mailed Mar. 9, 2010 in U.S. Appl. No. 12/179,195.

* cited by examiner

*Primary Examiner* — Y My Quach Lee
(74) *Attorney, Agent, or Firm* — Plumsea Law Group, LLC; Mark E. Duell

(57) ABSTRACT

A system for providing diffuse light to a dial plate of a meter is disclosed. The system includes a light-guide and a light source. The light from the light source enters the light-guide and exits the light-guide to illuminate a curved peripheral portion of a dial plate with a diffuse light.

29 Claims, 6 Drawing Sheets

DIAL PLATE WITH DIFFUSE LIGHTING

CROSS REFERENCE TO RELATED APPLICATION

This application is a continuation of U.S. application Ser. No. 12/179,195 filed Jul. 24, 2008 now U.S. Pat. No. 7,758,195, entitled "Dial Plate with Diffuse Lighting", issued on Jul. 20, 2010, the disclosure of which is hereby incorporated by reference in its entirety.

BACKGROUND OF THE INVENTION

1. Field of the Invention

The present invention relates to motor vehicles and in particular to a system for lighting a dial plate of a meter.

2. Description of Related Art

Lighting systems for lighting meters associated with a dashboard of a motor vehicle have been previously proposed. Yoshida et al. (Japanese Patent Number 60,239,605) is directed to a system for improving visibility of an indicator position. Yoshida teaches an indicating member disposed on the periphery of an indicating plate.

Yoshida teaches a system including a light transmissible indicator that is associated with an indicating dial plate. Yoshida teaches that a greater part of the dial plate is flat, while an outside periphery includes an inclined part that is printed with characters. Light is emitted at a light source and transferred through a light-guiding plate. Yoshida teaches that light is only reflected onto the inclined part and the rest of the dial plate remains dark. Yoshida teaches a dial plate that has an inclined part that extends below the base of the dial plate. The light-guiding plate Yoshida teaches is oriented to direct light down onto the inclined part of the dial plate.

Ikarashi et al. (U.S. Pat. No. 6,959,995) is directed to an illuminating apparatus. Ikarashi teaches a dial constituting a display member that is configured to be illuminated by light emitting diodes. Ikarashi teaches a dial constituting a display member configured to be illuminated by the light emitting diodes positioned at a rear side of the dial. In particular, index portions are illuminated by reflecting light from reflecting portions and by transmitting light through a light-guide member. This system allows the light to be efficiently guided from the light emitting diodes to the interior of a hollow portion to illuminate the index portions.

Both Yoshida and Ikarashi lack provisions for providing diffuse light on an outer curved portion of a dial plate. There is a need in the art for a solution to this problem.

SUMMARY OF THE INVENTION

A system for providing diffuse lighting for a dial plate is disclosed. Generally, this system can be used in connection with a motor vehicle. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

In one aspect, the invention provides a motor vehicle, comprising: a dial plate including a central portion and a curved peripheral portion disposed radially away from the central portion; a light-guide disposed radially inward of the curved peripheral portion, the light-guide being configured to receive light from at least one light source; and where the light-guide includes a light exiting portion that is oriented towards the curved peripheral portion.

In another aspect, the light-guide is configured to direct light in a direction having a radial component and an axial component.

In another aspect, the light-guide is disposed proximally to the curved peripheral portion.

In another aspect, the light-guide has a ring-like shape.

In another aspect, the light-guide includes an opaque portion configured to prevent light from escaping from at least one portion of the light-guide.

In another aspect, the light-guide includes a base portion disposed adjacent to the central portion.

In another aspect, the base portion includes a color printing to color light passing through the base portion.

In another aspect, the invention provides a motor vehicle, comprising: a dial plate including a central portion and a curved peripheral portion disposed radially away from the central portion; an outer radial portion of the curved peripheral portion and an inner radial portion of the curved peripheral portion; a light-guide disposed radially inward of the curved peripheral portion; the light-guide including a light exiting portion configured to illuminate the curved peripheral portion, including the inner radial portion and the outer radial portion; and where the inner radial portion is associated with a first brightness that is substantially equal to a second brightness associated with the outer radial portion.

In another aspect, an illuminated region associated with the curved peripheral is associated with a generally diffuse light pattern.

In another aspect, the illuminated region covers a majority of the curved peripheral portion.

In another aspect, the illuminated region is associated with at least one indicia disposed on the curved peripheral portion.

In another aspect, the curved peripheral portion includes an intermediate radial portion disposed between the outer radial portion and the inner radial portion.

In another aspect, the intermediate radial portion is associated with a third brightness that is substantially similar to the first brightness and the second brightness.

In another aspect, the invention provides a motor vehicle, comprising: a dial plate including a central portion and a curved peripheral portion disposed radially away from the central portion; a light-guide disposed radially inward of the curved peripheral portion, the light-guide being configured to direct light towards the curved peripheral portion; the light-guide having a base portion and a top portion; the base portion being disposed adjacent to a first side of the central portion with respect to an axial direction; a top portion extending a first axial height above the central portion; an inner radial portion of the curved peripheral portion that is disposed adjacent to the first side of the central portion with respect to the axial direction; an outer radial portion extending a second axial height above the central portion; and where the second axial height is greater than the first axial height.

In another aspect, the light-guide includes a light exiting portion that is oriented towards the curved peripheral portion.

In another aspect, the inner radial portion is associated with a first brightness.

In another aspect, the outer radial portion is associated with a second brightness.

In another aspect, the first brightness is substantially equal to the second brightness.

In another aspect, the light-guide includes a rear portion that includes a hot silver stamp.

In another aspect, the light-guide is disposed proximally to the curved peripheral portion.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
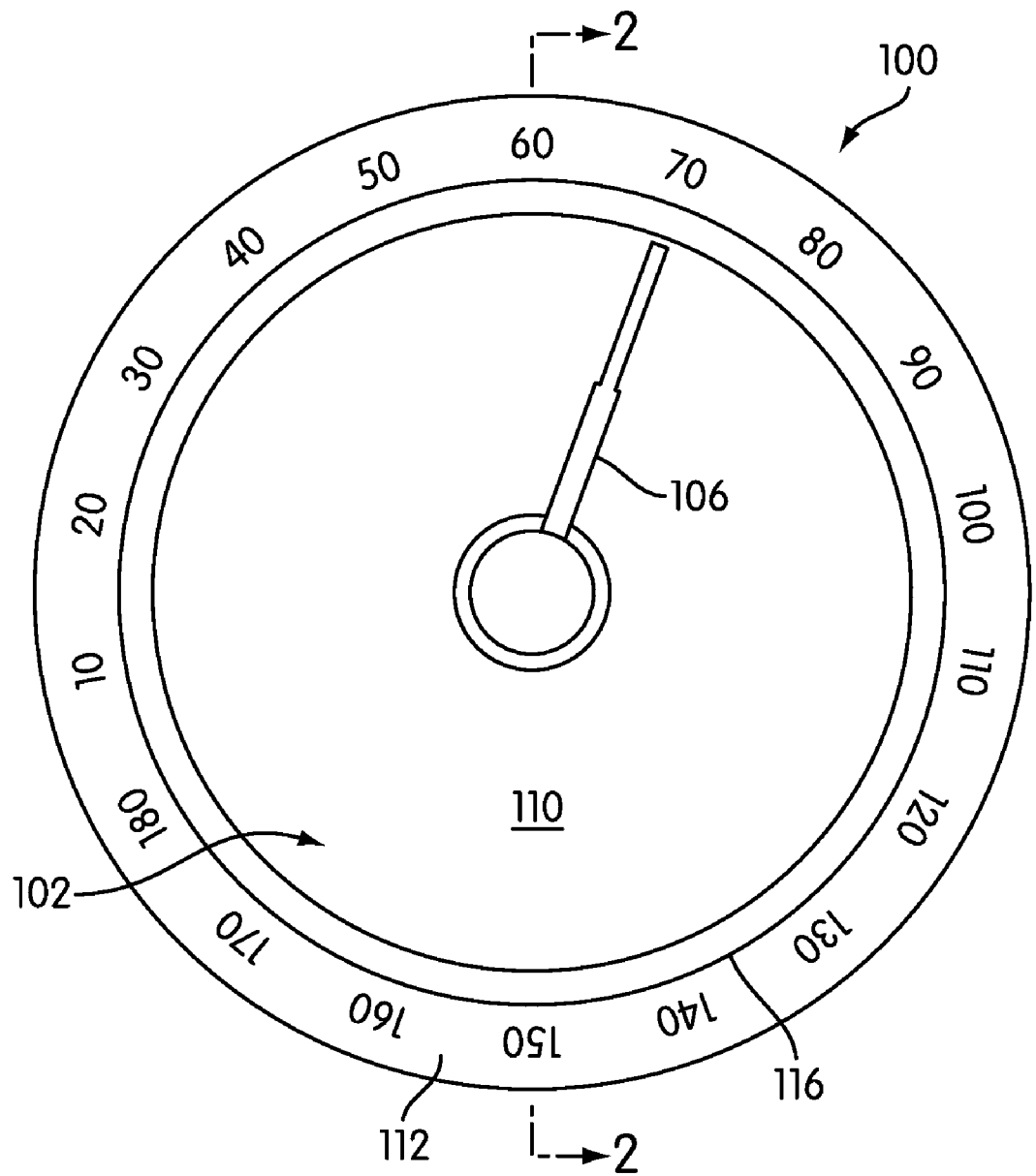
FIG. 1 is a top view of an embodiment of a meter with a dial plate and a needle.

FIG. 1 is a front view of an embodiment of meter 100. Meter 100 may be associated with a motor vehicle of some kind. Generally, meter 100 could be associated with any type of motor vehicle, including, but not limited to, cars, trucks, vans, minivans, SUVs, motorcycles, scooters, boats, personal watercraft, and aircraft.

Generally, meter 100 may be placed in any location in a motor vehicle visible to a driver or passenger. In some embodiments, meter 100 may be disposed on a central console of a motor vehicle. In other embodiments, meter 100 may be disposed on a ceiling console of a motor vehicle. In an embodiment, meter 100 may be disposed on an instrument panel situated on a dashboard of a motor vehicle.

Generally, meter 100 may be any type of device configured to convey information to a driver or passenger. In some embodiments, meter 100 may be a tachometer. In other embodiments, meter 100 may be a fuel gauge. In the embodiment shown in FIG. 1, meter 100 is a speedometer and displays the instantaneous speed of a motor vehicle. In some cases, meter 100 may include an odometer. For the sake of clarity, an odometer is not included in this embodiment.

Meter 100 may be associated with dial plate 102. Dial plate 102 may include central portion 110. Additionally, dial plate 102 may include curved peripheral portion 112. In some embodiments, curved peripheral portion 112 is disposed radially away from central portion 110.

In some embodiments, dial plate 102 may include numerical values, indication marks or other indicia to indicate, for example, a vehicular speed. In some cases, numerical values may be printed on central portion 110. In other cases, numerical values may be printed on another portion of dial plate 102. In some embodiments, numerical values are printed on curved peripheral portion 112.

Meter 100 may also be associated with needle 106. In some embodiments, needle 106 extends radially from a central location on central portion 110. Generally, needle 106 may be configured to rotate with respect to dial plate 102. With this arrangement, needle 106 is configured to indicate a vehicle speed by pointing to numerical values or indication marks printed on curved peripheral portion 112. Additionally, needle 106 could be configured to point to various indicia disposed on central portion 110 of dial plate 102.

In some embodiments, a meter includes provisions to ensure visibility during low light situations. In some embodiments, a dial plate may be configured with backlighting to illuminate portions of the dial plate. In some cases, printing on a dial plate may be transparent so lighting behind the dial plate causes the printing to be illuminated. In other embodiments, a meter may include cabaret or theater style lighting from above and spot light the surface of a dial plate. In some embodiments, a meter may be associated with evenly distributed diffuse lighting.

In some embodiments, a light-guide may be disposed on a central portion of a dial plate proximate to a curved peripheral portion to provide diffuse lighting to a portion of the dial plate. By locating a light-guide radially inward of a curved peripheral portion of a dial plate, the light-guide may be configured to direct light onto the curved peripheral portion. In other embodiments, a light-guide may be disposed a greater distance from a curved peripheral portion. With this arrangement, portions of a central portion may also be illuminated. Generally, a light-guide may be disposed in any location on a dial plate in order to illuminate particular portions of a dial plate with an even diffuse light.

In some embodiments, dial plate 102 includes light-guide 116. In some embodiments, light-guide 116 is disposed proximate to curved peripheral portion 112 on central portion 110. In particular, light-guide 116 may be disposed radially inward of curved peripheral portion 112. Generally, light-guide 116 may be shaped in any manner to provide diffuse light to a desired portion of dial plate 102. In some cases, light-guide 116 may be disposed in a partial circle radially around dial plate 102. In some embodiments, light-guide 116 extends in a ring-like manner proximate to curved peripheral portion 112. With this arrangement, light-guide 116 may be configured to project diffuse light on curved peripheral portion 112 of dial plate 102.

In some embodiments, substantially transparent materials may be used to construct a portion or all of light-guide 116. Generally, any material that is substantially transparent may be used. In some embodiments, for example, light-guide 116 may be made of transparent plastic. In some cases, polycarbonate may be used. In an embodiment, light-guide 116 may be constructed from polymethyl methacrylate (PMMA).

Figure 2:
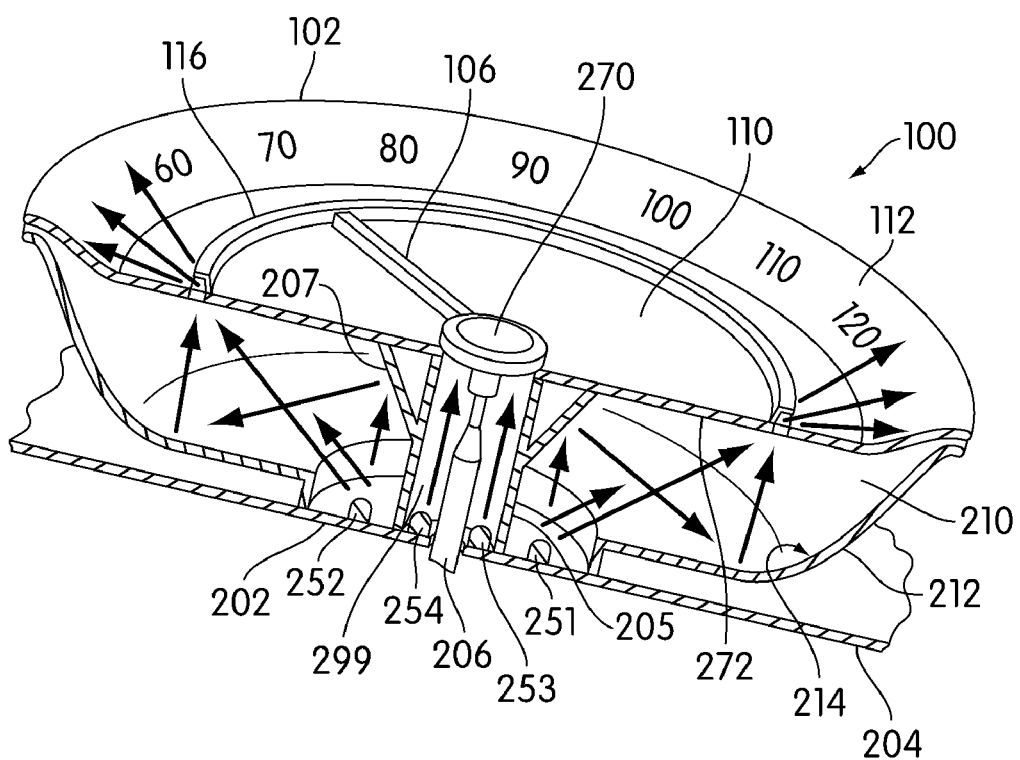
FIG. 2 is an isometric view of a cross section of an embodiment of a meter.

FIG. 2 illustrates a cross section of an embodiment of meter 100. Case 212 is visible in this view and may be attached to second side 272 of dial plate 102. Case 212 and dial plate 102 may encompass interior cavity 210 of meter 100. In some embodiments, interior cavity 210 may be associated with structural components 207 to support dial plate 102.

In the current embodiment, interior cavity 210 includes wall 205. In some embodiments, wall 205 houses components necessary for the functioning of meter 100. For example, in the current embodiment, wall 205 houses shaft 206. Generally, shaft 206 may be configured to turn needle 106 so that needle 106 indicates the speed of the motor vehicle. In some cases, shaft 206 may be connected to a motor configured to rotate shaft 206 according to instructions from an on-board computer. In other embodiments, other components necessary for the functioning of meter 100 may be housed within interior cavity 210.

In some embodiments, an interior cavity may be associated with light sources configured to provide light for a light-guide. In some embodiments, a plurality of light sources may be configured to provide light for a light-guide. In some cases, the plurality of light sources may be disposed in a radial pattern similar to the shape of the light-guide. In other embodiments, a single light source may be configured to supply light to a light-guide. Generally, a light-guide may be configured to receive light from at least one light source.

Interior cavity 210 may be associated with light sources 202. In some embodiments, light sources 202 may be disposed on a portion of printed circuit board 204 disposed within interior cavity 210. In this embodiment, light sources 202 may include first light source 251 and second light source 252 disposed below central portion 110. In some embodiments, light sources 251 and 252 are configured to illuminate interior cavity 210 and provide light for light-guide 116. This arrangement allows light-guide 116 to illuminate curved peripheral portion 112.

While this embodiment includes light sources 251 and 252 as light sources for light-guide 116, in other embodiments light-guide 116 may receive light from any number of light sources. Additionally, it should be understood that light sources 251 and 252 may also be configured to provide light to other portions of dial plate 102 in some embodiments. In some cases, light from light sources 251 and 252 could be configured to provide backlighting to one or more portions of central portion 110.

In some embodiments, meter 100 includes provisions for illuminating needle 106 as well. In this embodiment, light sources 202 may include third light source 253 and fourth light source 254 disposed within wall 205. Third light source 253 and fourth light source 254 may illuminate central cavity 299 that is surrounded by wall 205. In some embodiments, cap 270 is configured to receive light from light sources 253 and 254 and direct the light into needle 106. With this arrangement, needle 106 may be illuminated and visible to a driver during low light situations.

Generally, light sources 202 could be any type of lighting configured to illuminate portions of dial plate 102. In some cases, light sources may include compact fluorescent lights. In still other cases, light sources 202 may include lighting from a halogen lamp. In an embodiment, light sources 202 may be white light-emitting diodes (LEDs).

In some embodiments, case 212 is configured to direct light to various portions of dial plate 102, including light-guide 116. As seen in FIG. 2, light emitted from light sources 251 and 252 may scatter axially and radially towards dial plate 102 and light-guide 116. In some embodiments, the shape of case 212 may facilitate the transfer of light throughout interior cavity 210. In other embodiments, case 212 may include reflective surfaces or coatings to increase light transfer from light sources 251 and 252 to light-guide 116.

In this embodiment, the shape of case 212 may help to direct light to light-guide 116 as well as other portions of dial plate 102. In some embodiments, case 212 may be configured with a concave shape to direct scattered light upward. In other embodiments, case 212 may be configured with another shape to direct scattered light in a desired direction. In some embodiments, case 212 may have a concave shape that is generally flat beneath central portion 110 and that curves upwards towards curved peripheral portion 112. With this configuration, light emitted from light sources 251 and 252 may be reflected and directed toward light-guide 116.

Figure 5:
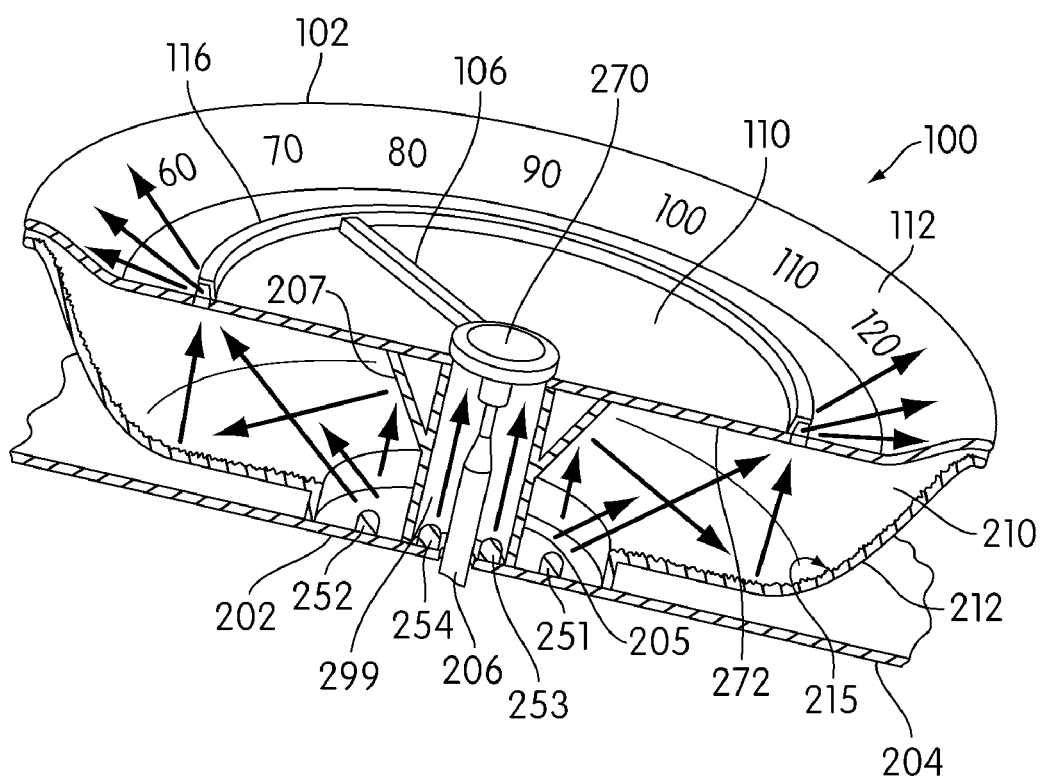
FIG. 5 is a isometric view of a cross section of a second embodiment of a meter.
Figure 6:
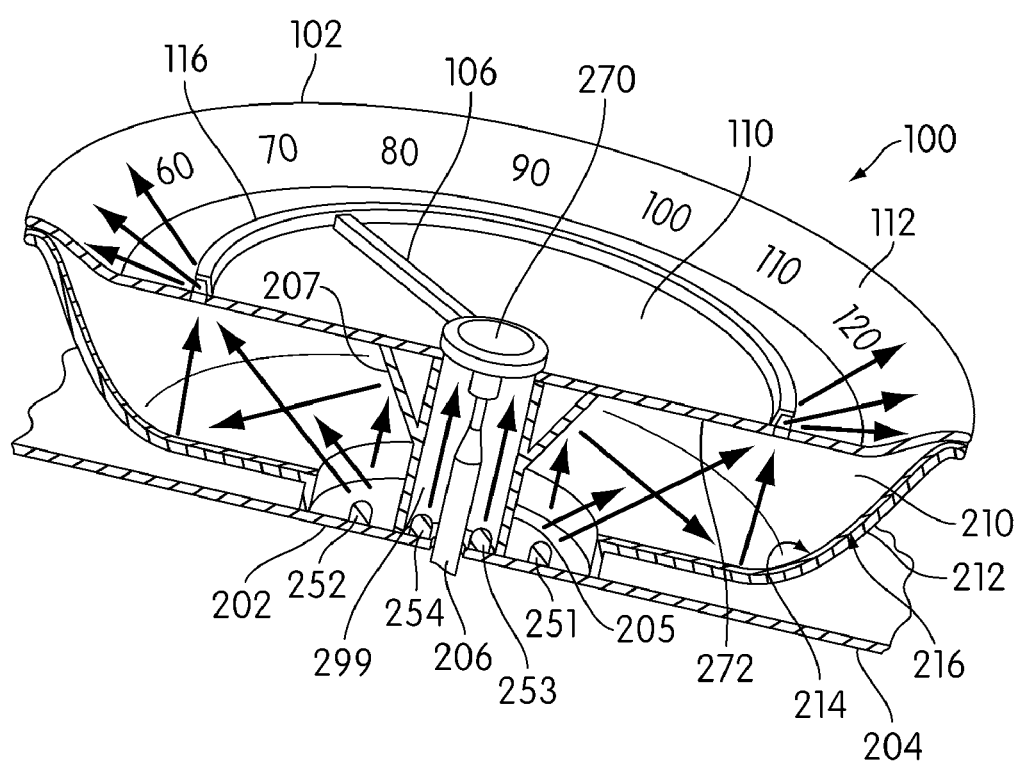
FIG. 6 is a isometric view of a cross section of a third embodiment of a meter.

In some embodiments, interior surface 214 of case 212 may include provisions to direct or reflect the light emitted from light sources 251 and 252 toward light-guide 116 in order to improve efficiency. In some cases, interior surface 214 may be a rough surface to produce diffuse reflection, as shown by surface 215 in FIG. 5. In other cases, interior surface 214 may be a smooth reflective surface, as shown by surface 214 in FIG. 2. In an embodiment, interior surface 214 may be manufactured or coated with a reflective material such as a reflective paint, as shown by material layer 216 in FIG. 6.

As seen in FIG. 2, when light is emitted by light sources 251 and 252, some light rays may escape directly to light-guide 116. Other light rays may scatter and be reflected off structural components 207 and/or interior surface 214 of case 212. Typically, multiple reflections of light rays may occur within interior cavity 210 before light escapes via light-guide 116. For example, a light ray from first light source 251 may strike one of structural components 207 then reflect off interior surface 214 before escaping to light-guide 116. With this arrangement, light emitted from light-guide 116 may include light that is initially emitted from light sources 251 and 252 in any number of directions.

For purposes of clarity, the discussion regarding the lighting of meter 100 is largely limited to the diffuse light provided by light-guide 116. However, in other embodiments, LCD displays or other lighting sources and devices may be used in addition to the diffuse light dispensed by light-guide 116. In addition, in some embodiments, dial plate 102 may also be configured with transparent portions for back lighting. Generally, multiple lighting devices and effects may be employed simultaneously.

Figure 3:
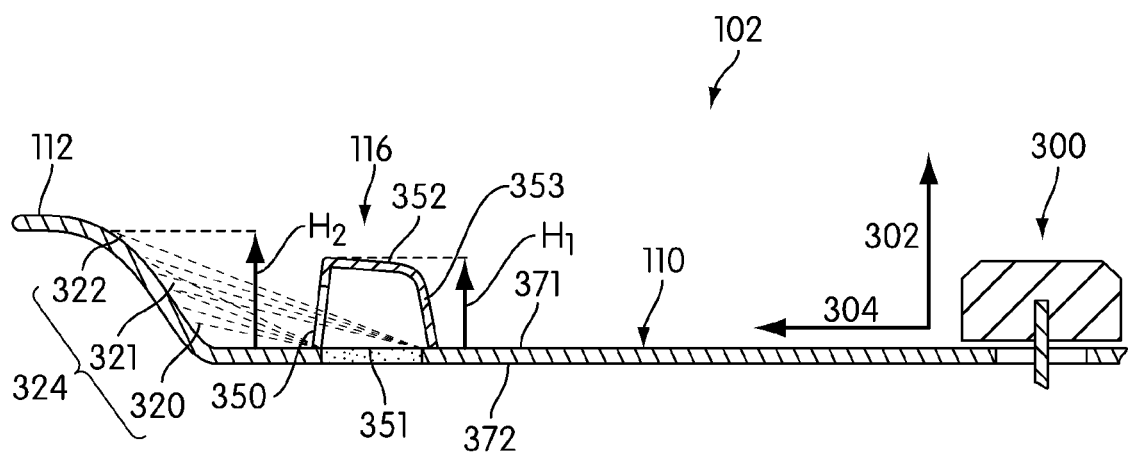
FIG. 3 is a cross sectional view of an embodiment of a of a dial plate with a light-guide.

FIG. 3 is a cross section of an embodiment of dial plate 102 and light-guide 116. In this embodiment, dial plate 102 may be associated with axial direction 302. In this case, axial direction 302 is generally perpendicular to central portion 110 of dial plate 102. In addition, dial plate 102 may be associated with radial direction 304. In this case, radial direction 304 is generally oriented outward from center 300 of dial plate 102 toward curved peripheral portion 112.

In this embodiment, light-guide 116 includes top portion 352 and base portion 351. Top portion 352 extends first axial height H1 above central portion 110. By extending first axial height H1 above central portion 110, top portion 352 may provide light-guide 116 with sufficient height to illuminate a portion of curved peripheral portion 112. Also, base portion 351 may be disposed adjacent to first side 371 of central portion 110 in axial direction 302. With this arrangement, base portion 351 may receive light from light sources disposed beneath second side 372 of central portion 110.

As discussed with reference to FIG. 2, light from light sources 251 and 252 may exit interior cavity 210 via light-guide 116. In particular, light may enter light-guide 116 at base portion 351. In some embodiments, base portion 351 includes blue printing to color light exiting light-guide 116. Generally, base portion 351 may include any color printing to color light exiting light-guide 116. With this arrangement, light-guide 116 may illuminate curved peripheral portion 112 with a blue diffuse light.

In order to guide the light through light-guide 116, portions of light-guide 116 may be opaque. For example, portions of light-guide 116 may be painted or stamped with a paint or ink that does not transmit light. In some embodiments, a silver hot stamp may be applied to top portion 352 and rear portion 353 of light-guide 116. In some embodiments with this stamped arrangement, base portion 351 and light-exiting portion 350 are the only transparent portions of light-guide 116. Generally, any type of coating may be applied to any portion of light-guide 116 to direct the transmission of light from light-guide 116.

In this embodiment, light exiting portion 350 is oriented towards curved peripheral portion 112 and configured to illuminate curved peripheral portion 112. The light directed through light exiting portion 350 includes a component disposed in radial direction 304 and a component disposed in axial direction 302. With components of directions 302 and 304, the light illuminates multiple portions of curved peripheral portion 112 of dial plate 102. In particular, light is directed so that illuminated region 324 is lit with a generally diffuse light pattern.

In this embodiment, illuminated region 324 may extend from inner radial portion 320 to outer radial portion 322 to encompass a majority of curved peripheral portion 112. Inner radial portion 320 of curved peripheral portion 112 is disposed adjacent to first side 371 of central portion 110 with respect to axial direction 302. Also, outer radial portion 322 of curved peripheral portion 112 extends second axial height H2 above central portion 110. In some embodiments, second axial height H2 is greater than first axial height H1 of light-guide 116.

In some embodiments, the brightness of illuminated region 324 is evenly distributed to provide a pleasing aesthetic look. In this embodiment, inner radial portion 320 may be associated with a first brightness. Furthermore, outer radial portion 322 may be associated with a second brightness. In some embodiments, the first brightness is substantially equal to the second brightness. In addition, curved peripheral portion 112 may be associated with intermediate radial portion 321 that is disposed between outer radial portion 322 and inner radial portion 320. Intermediate radial portion 321 may be associated with a third brightness that is substantially similar to the first brightness and second brightness of radial portions 320 and 322, respectively. Using this arrangement, the diffuse light from light-guide 116 may be evenly distributed throughout illuminated region 324 providing an aesthetically desirable look for dial plate 102.

Figure 4:
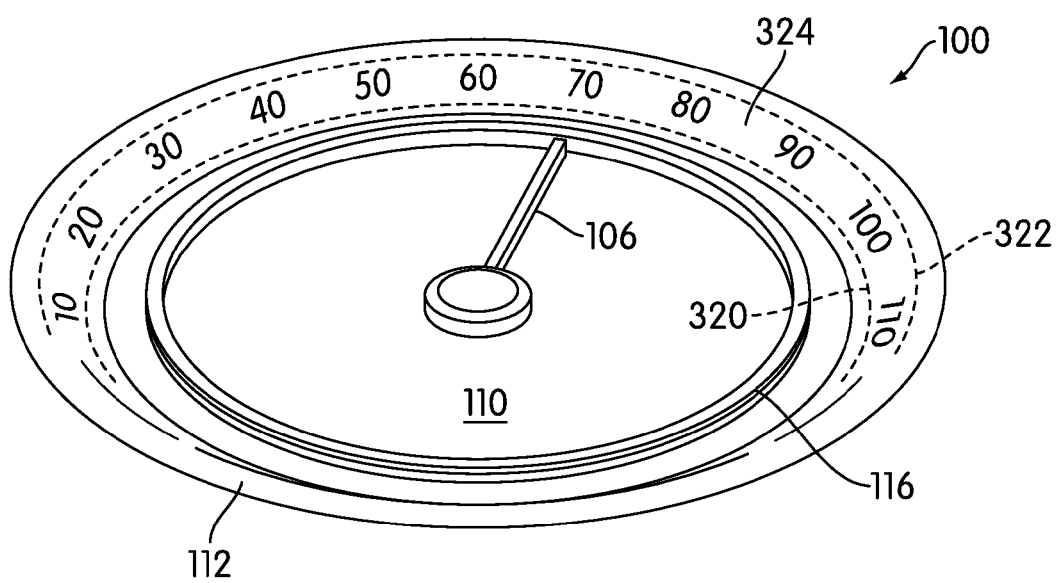
FIG. 4 is an embodiment of a meter illuminated with a diffuse light.

Referring to FIG. 4, a diffuse light pattern provided by light-guide 116 is clearly visible on illuminated region 324. In particular, illuminated region 324 is disposed in a ring-like manner around curved peripheral portion 112. In this embodiment, illuminated region 324 illuminates numerical values ranging from 10 to 180 printed on curved peripheral portion 112. Generally, illuminated region 324 may be associated with at least one indicia disposed on curved peripheral portion 112. With this arrangement, a driver may clearly see the necessary information indicated on meter 100 with the diffuse light provided by light-guide 116.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A meter, comprising:
    a dial plate including a central portion and a curved peripheral portion disposed radially away from the central portion;
    a light-guide disposed on the dial plate radially inward of the curved peripheral portion, the light-guide being configured to receive light from at least one light source; and
    wherein the light-guide includes a light exiting portion that is oriented towards the curved peripheral portion and is tilted at an angle so as to direct light in a direction having a radial component and an axial component.

2. The meter according to claim 1, wherein the light-guide extends a first axial height above the central portion, and the light-guide is configured such that the light exiting the light exiting portion illuminates the curved peripheral portion over an illuminated region, the illuminated region having a second axial height above the central portion, wherein the second axial height is greater than the first axial height.

3. The meter according to claim 1, wherein the meter further includes a reflective cavity and a central cavity;
    the reflective cavity including the at least one light source;
    the central cavity being surrounded by a wall, the wall separating the central cavity from the reflective cavity;
    wherein a support component extends angularly from the wall to the dial plate, the support component being reflective and located such that light from the at least one light source reflects off of the support component.

4. The meter according to claim 1, wherein the light-guide has a ring-like shape.

5. The meter according to claim 1, wherein the light-guide includes an opaque portion configured to prevent light from escaping from at least one portion of the light-guide.

6. The meter according to claim 1, wherein the light-guide includes a base portion disposed adjacent to the central portion.

7. The meter according to claim 6, wherein the base portion includes a color printing to color light passing through the base portion.

8. A meter, comprising:
    a dial plate including a central portion and a curved peripheral portion disposed radially away from the central portion;
    an outer radial portion of the curved peripheral portion and an inner radial portion of the curved peripheral portion;
    a light-guide disposed radially inward of the curved peripheral portion; the light-guide receiving light from at least one light source, the light-guide including a light exiting portion configured to illuminate substantially the entirety of the curved peripheral portion, including the inner radial portion and the outer radial portion, such that the inner radial portion and the outer radial portion have a constant brightness when viewed from an axial direction.

9. The meter according to claim 8, wherein an illuminated region associated with the curved peripheral portion is associated with a generally diffuse light pattern.

10. The meter according to claim 9, wherein the illuminated region covers a majority of the curved peripheral portion.

11. The meter according to claim 8, wherein the meter further comprises:
    a reflective cavity including the least one light source;
    a central cavity surrounded by a wall, the wall separating the central cavity from the reflective cavity;
    a support component extending angularly from the wall to the dial plate, the support component being reflective and located such that light from the at least one light source reflects off of the support component.

12. The meter according to claim 8, wherein the curved peripheral portion includes an intermediate radial portion disposed between the outer radial portion and the inner radial portion.

13. The meter according to claim 12, wherein the light exiting portion is configured to illuminate substantially the entirety of the curved peripheral portion, including the inner radial portion, the outer radial portion, and the intermediate radial portion; such that the inner radial portion, the outer radial portion, and the intermediate radial portion all have a constant brightness when viewed from an axial direction.

14. A meter, comprising:
 a dial plate including a central portion and a curved peripheral portion disposed radially away from the central portion;
 a light-guide disposed radially inward of the curved peripheral portion, the light-guide receiving light from at least one light source and being configured to direct light towards the curved peripheral portion;
 the light-guide having a base portion and a top portion;
 the base portion being disposed adjacent to a first side of the central portion with respect to an axial direction;
 the top portion extending a first axial height above the central portion;
 the curved peripheral portion comprising an inner radial portion that is disposed adjacent to the first side of the central portion with respect to the axial direction, and an outer radial portion; and
 the light-guide is configured such that light exiting the light-guide illuminates the curved peripheral portion over an illuminated region, the illuminated region having a second axial height above the central portion, wherein the second axial height is greater than the first axial height.

15. The meter according to claim 14, wherein the light-guide includes a light exiting portion that is oriented towards the curved peripheral portion.

16. The meter according to claim 14, wherein the inner radial portion is illuminated by light exiting the light-guide so as to have a first brightness when viewed from an axial direction.

17. The meter according to claim 16, wherein the outer radial portion is illuminated by light exiting the light-guide so as to have a second brightness when viewed from an axial direction, the first brightness being substantially equal to the second brightness.

18. The meter according to claim 17, wherein the meter further comprises
 a reflective cavity including the least one light source;
 a central cavity surrounded by a wall, the wall separating the central cavity from the reflective cavity;
 a support component extending angularly from the wall to the dial plate, the support component being reflective and located such that light from the at least one light source reflects off of the support component.

19. The meter according to claim 14, wherein the light-guide includes a rear portion, disposed radially farthest from the curved peripheral portion than any other portion of the light-guide, that includes a hot silver stamp.

20. The meter according to claim 14, wherein the light-guide is disposed proximally to the curved peripheral portion.

21. A meter, comprising:
 a reflective cavity including at least one light source;
 a dial plate arranged on top of the cavity;
 the dial plate including a central portion, a curved peripheral portion disposed radially away from the central portion, and a light exiting portion;
 a central cavity surrounded by a wall, the wall separating the central cavity from the reflective cavity;
 a support component extending angularly from the wall to the dial plate, the support component being reflective and located such that light from the at least one light source reflects off of the support component;
 wherein the reflective cavity is configured such that light exits the light exiting portion in a direction having a radial component and an axial component; and
 wherein the reflective cavity includes a plurality of light sources arranged in a radial pattern around a center of the meter, the plurality of light sources being located adjacent to the wall and below the structural component, and the plurality of light sources are recessed below a remainder of the reflective cavity.

22. The meter of claim 21, wherein the reflective cavity includes a reflective flat central portion disposed adjacent to the at least one light source, the reflective flat central portion being adjacent to and continuous with a reflective curved radial portion disposed radially away from the at least one light source.

23. The meter of claim 21, wherein the reflective cavity has a concave shape.

24. The meter of claim 23, wherein the central cavity includes at least one light source.

25. The meter of claim 24, wherein the meter further comprises a central cavity cap and a movable needle attached to the cap;
 the cap being located on top of the central cavity, and the cap being configured to receive light from the at least one light source in the central cavity and direct the light into the needle.

26. The meter of claim 21, wherein the at least one light source comprises a single light source.

27. The meter of claim 21, wherein the at least one light source comprises a plurality of light sources.

28. The meter of claim 21, wherein an internal surface of the reflective cavity is a rough reflective surface that produces a diffuse reflection.

29. The meter of claim 21, wherein an internal surface of the reflective cavity comprises a reflective paint.

* * * * *